Aug. 25, 1953 R. BRAY ET AL 2,650,311

RADIANT ENERGY DETECTING METHOD AND APPARATUS

Filed Oct. 26, 1950

INVENTORS
RALPH BRAY &
KARL LARK-HOROVITZ
BY [signature]
ATTORNEY

Patented Aug. 25, 1953

2,650,311

UNITED STATES PATENT OFFICE 2,650,311

RADIANT ENERGY DETECTING METHOD AND APPARATUS

Ralph Bray, West Lafayette, and Karl Lark-Horovitz, Lafayette, Ind., assignors to Purdue Research Foundation, Lafayette, Ind., a corporation of Indiana Application October 26, 1950, Serial No. 192,220

10 Claims. (Cl. 250—83.3)

Figures 1, 2, 3:
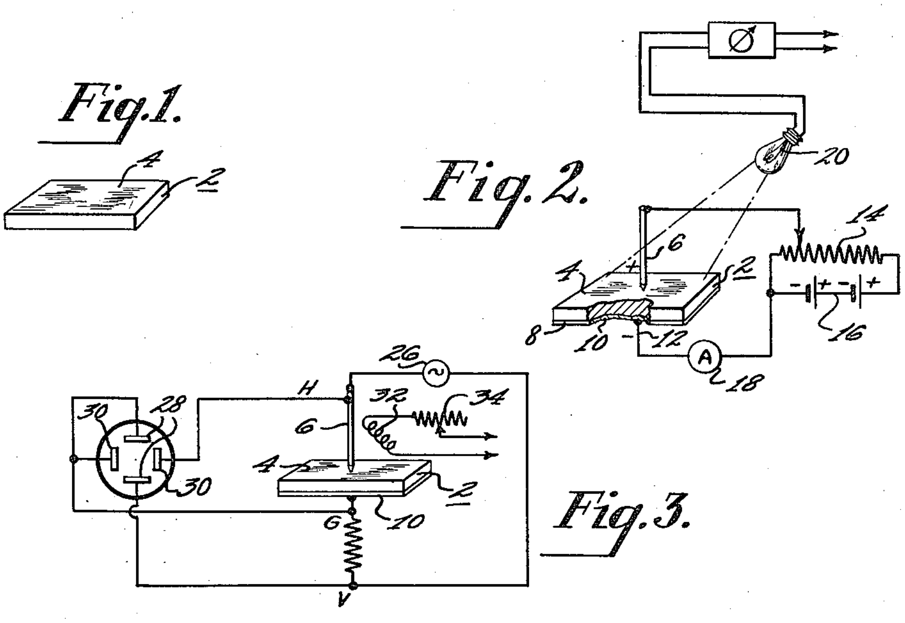

The present invention relates to novel apparatus including an element sensitive to radiant and heat energy. More particularly, the invention relates to novel apparatus including a body of P-type germanium semi-conducting material and a point contact electrode. The invention also relates to a novel method of detecting changes in radiant and heat energy.

It has previously been known that germanium semi-conducting material may be of either so-called "N-type" or "P-type." In the former, conduction is believed to take place at room temperatures, due to the presence of negative (electron) carriers in the conduction band. In the latter, conduction is believed to occur due to the presence of positively charged carriers or so-called "holes" in the valence or full band.

P-type germanium semi-conducting material can be prepared in various ways. One way is to alloy highly purified germanium with small amounts of aluminum. Enough aluminum is added to furnish at least about $10^{16}$ impurity atoms/cc. Another way is to bombard N-type germanium with nucleons. The latter process is more fully described in the copending application, Serial No. 67,198, filed December 24, 1948, of Karl Lark-Horovitz. It is also possible to produce P-type germanium by controlling the heating time and temperature when melting pure germaniun powder in a furnace so that the melt contains impurities in addition to the germanium.

Briefly summarized, the present invention is based upon the discovery that the current-voltage characteristic of a point-contact type rectifier utilizing P-type semi-conducting germanium can be significantly changed by directing radiant energy; i. e. light or heat, or other heat energy, at the area of contact of the point-contact (or rectifying) electrode with the semi-conductor. By raising the intensity of the impinging radiant energy sufficiently, the rectification in the low voltage region can even be reversed. That is, a larger current can be caused to flow in the back direction than in the forward direction. Apparatus utilizing the newly discovered phenomenon and constructed in accordance with the principles of the present invention comprises, first, a body of P-type germanium semi-conducting material, one electrode in point contact with a surface of the semi-conductor body, and another electrode in contact with another surface of the body. The apparatus may also include a source of light, preferably of variable intensity, or a source of heat, disposed adjacent the surface of the semi-conductor to which the first electrode makes contact. If light is used as the source of radian energy, the light is directed near or on the point of contact of the point-contact electrode. If heat is used, the heat may be applied to the whole unit. By point-contact electrode is meant one which makes contact over a relatively small surface area in contrast with an electrode comprising, for example, a layer of solder. The actual area of contact may be a thin line or wedge rather than a point. Another term for this type of electrode is—rectifying contact electrode.

When the above described apparatus is operated in a manner to be more fully described later, it serves as an improved device in a method for detecting changes in intensity of radiant energy.

One object of the present invention is to provide an improved apparatus including a photosensitive element.

Another object of the invention is to provide an improved apparatus including a thermosensitive element.

Another object of the invention is to provide an improved apparatus capable of detecting relatively small changes in light intensity.

Another object of the invention is to provide an improved apparatus capable of detecting relatively small changes in temperature.

Another object of the invention is to provide an improved method of detecting changes in intensity of radiant energy.

Another object of the invention is to provide an improved sensitive trigger device.

Still another object of the invention is to provide improved apparatus responsive to changes in intensity of radiant energy.

These and other objects will be more apparent and the invention will be more readily understood with reference to the following description, including the drawings, of which:

Figure 1 is a perspective view of a body of semi-conductive material suitable for use in the present invention, Figure 2 is a view, partially diagrammatic, of apparatus constructed in accordance with the present invention, the apparatus including a light source and employing the body shown in Figure 1, Figure 3 is a view of another form of apparatus embodying the principles of the present invention and including a heat generator as a source of radiant energy.

Figure 5:
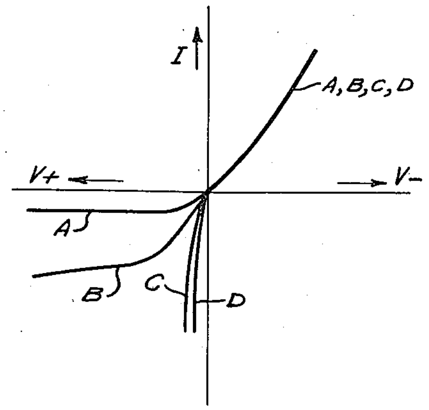
Figure 6:
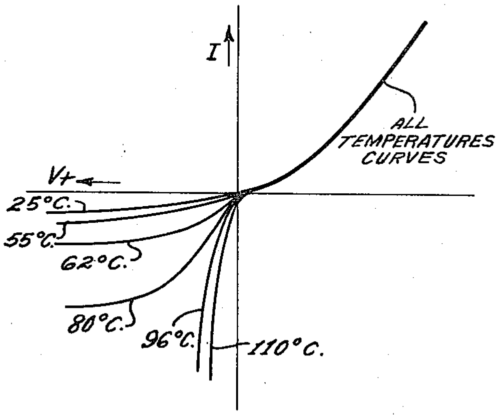
Figure 4:
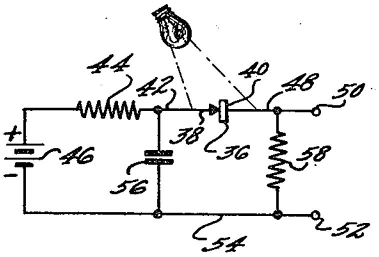

Figure 4 is a view of one embodiment of at trigger device which may be constructed in accordance with the present invention, Figure 5 is a graph showing a family of voltage-current characteristics plotted from measurements made on the rectified output of the device included in the present invention and illustrating how these characteristics vary with the intensity of light directed upon the radiant or heat energy responsive element, and Figure 6 is a family of curves similar to Figure 5 but showing how the voltage-current characteristics vary with intensity of applied heat.

Typical apparatus constructed in accordance with the principles of the invention will now be described with reference to the drawings. In the different figures, similar parts have the same reference characters.

A radiant or heat energy sensitive device in accordance with the present invention includes a body of semi-conducting P-type germanium. A small slab 2 of material may be cut from a germanium ingot. A surface 4 of the slab is then suitably prepared, as in making germanium rectifiers. This may be done by, first, grinding a face of the slab with 600 mesh alumina and then etching with either hot hydrogen peroxide or some other suitable etching solution such as a mixture of nitric and hydrofluoric acids.

An electrode in the form of a sharpened whisker of metal 6 is then mounted in contact with a point on the freshly prepared surface. The metal out of which the whisker is made is preferably any relatively soft metal such as aluminum, copper, gold, tantalum, cadmium, tin, or zinc. Phosphor bronze is also suitable for this purpose. The harder metals such as tungsten do not make good contact electrodes for purposes of the present invention. The diameter of the whisker may be about 5 mils. The force used to press the whisker against the prepared surface is preferably not more than 10 gm. and may be less.

The opposite face 8 of the semi-conductor body is provided with a base electrode comprising a layer of solder 10 in which is embedded the end of a conductor 12.

It has been found, unexpectedly, that a device of the type above described may be embodied in apparatus for detecting differences in intensity of light or heat. This is accomplished as follows: The point contact electrode and the base electrode are connected through a potentiometer 14 to a source of current, such as a battery 16 so that the point contact electrode is positive and the body is negative. A current indicator, such as a milliammeter 18 is connected in series with the electrodes and the current source. In the dark, little or no current flows because the back resistance is very high. But, when light is directed to or near the point of contact between the whisker electrode and the germanium body as from a light source 20, the resistance in the back direction is greatly reduced without appreciably affecting the forward resistance. The effect of increasing the intensity of light directed at the area of contact is illustrated in the family of curves of Figure 5. This family of curves was obtained using a source of A.-C. potential in place of the D.-C. source illustrated in Figure 2, and the ammeter was replaced by a circuit containing an oscilloscope connected as shown in Figure 3. The curves shown in Figure 5 are reproductions of the beam trace appearing on the screen of the oscilloscope. In this family of curves, curve A shows the current-voltage characteristic for the semi-conductor device, in the dark. The resistance in the back direction is much higher than the resistance in the forward direction. With the impingement of light, the characteristic shifts so that it takes the form of curve B. This curve shows that with the application of light the back resistance decreases while the forward resistance remains substantially the same as when no light was present.

When the light intensity is increased still further, the current-voltage characteristic takes forms corresponding to curves C and D of Figure 5. That is, the resistance in the back direction decreases still more until finally, in the low voltage region; i. e., about 2 volts, it becomes less than the resistance in the forward direction. This, in effect, causes a reversal of rectification.

A similar effect has been found when heat is directed to the point of contact of the whisker electrode. Suitable apparatus illustrative of this part of the invention is shown in Figure 3. A body of P-type semi-conducting germanium material similar to that described in the previous example is provided with a point contact electrode and a base electrode the same as in the previous example. A source of A.-C. potential 26 is connected across the electrodes. The vertical deflecting plates 28 and the horizontal deflecting plates 30 of an oscilloscope are also connected between the electrodes. With no light, and room temperature heat only applied to the point of contact of the whisker electrode with the semi-conductor, the current-voltage characteristic takes the form of the 25° C. curve shown in Figure 6. The curves of Figure 6 are all copies of beam traces observed on the oscilloscope screen. It will be observed that in the 25° C. curve the back resistance is higher than the forward resistance. But, when heat is applied, as from a coil of resistance wire 32, as shown in Figure 3, the back resistance is lowered.

The family of curves of Figure 6 shows how the current-voltage characteristic in the back direction changes when intensity of heat applied to the electrode contact point is increased. The curves for 55° C., 62° C., and 80° C. indicate that the back resistance becomes lower with increasing temperature. Finally, a temperature is reached for which the back resistance is less than the forward resistance. Curves for 96° C. and 110° C. illustrate this condition. At these higher temperatures, reversal of rectification takes place as in the case when intense light is applied. Suitable apparatus for calibrating one of the semi-conductor units may include a rheostat 34 or other means for varying the current through the resistance coil 32.

Using apparatus, such as illustrated in Figure 2, changes in intensity of either thermal or light energy may be detected and measured by taking readings on the current meter. After the apparatus is calibrated, temperature or light intensity may be read directly from the meter. One of the advantages of the improved method is that very small changes of intensity of the energy can be measured.

In accordance with another aspect of the present invention, apparatus may also be constructed which will serve as a light or heat operated switch (triggering device) or as a source of current pulsations. Referring to Figure 4, there is shown diagrammatically a germanium semi-conducting unit prepared as previously described. This unit may comprise a body of germanium 36, a point contact electrode 38 and a base electrode 40. The point contact electrode may be connected by means of a lead 42 through a resistor 44 to the positive terminal of a source of D.-C. potential 46. The base electrode is connected through a lead 48 to an output terminal 50. The negative side of the source of D.-C. potential is connected to another output terminal 52 through a lead 54. A capacitor 56 is connected in parallel with the source of potential and between the leads 42 and 54. A load resistor 58 may also be connected between the output terminals.

When neither heat nor light is applied to the point of contact between the whisker electrode 38 and the ground and etched surface of the germanium body 36, the capacitor is charged but very little current would flow through any circuit connected to the output terminals 50 and 52 because of the high back resistance of the semi-conductor unit. However, if light or heat is directed to the electrode contact area, the back resistance is suddenly lowered, the capacitor discharges and a pulse of current is applied across the load resistor 58 or across any circuit connected to the output terminals. A train of current impulses or oscillations can be generated by applying a succession of light or heat impulses to the sensitive contact area. Unlike the action of a thyratron gas tube, current flows in the output circuit only during the period light or heat is being directed to the sensitive area. When the radiant energy is removed, current ceases to flow.

There has thus been described a photosensitive device which functions as a photoconducting photo-diode. The device may also be operated by application of heat. It is particularly useful as a triggering device which may be actuated by radiant energy, or as a means for detecting and measuring changes in intensity of radiant energy.

We claim as our invention:

1. A method of detecting changes in the intensity of radiant and heat energy comprising directing said energy to an area adjacent the area of contact between the rectifying electrode and the body of an electrical device which includes a body of P-type germanium semi-conducting material, an electrode in rectifying contact with a surface thereof, and a base electrode, applying a potential between said rectifying electrode and said body in the back direction, and detecting changes in the intensity of electron current flow from said body to said rectifying electrode, which changes occur in response to changes in intensity of said energy.

2. A method according to claim 1 in which said applied potential is a D.-C. potential.

3. A method according to claim 1 in which said applied potential is an A.-C. potential.

4. A method according to claim 3 in which said electron current changes are observed as electron beam traces on the screen of a cathode ray oscilloscope.

5. A method of detecting changes in the intensity of heat energy comprising applying said energy to a body of P-type germanium semi-conducting material having an electrode in rectifying contact with a surface thereof, and a base electrode in contact with another surface thereof, with a potential being applied between said rectifying electrode and said body in the back direction, and detecting changes in the intensity of electron current flow from said body to said rectifying electrode, which changes occur in response to changes in intensity of said heat energy.

6. A method of determining the presence or absence of light at a particular point comprising employing a device comprising a body of P-type germanium semi-conducting material, an electrode in rectifying contact with a surface of said body, a base electrode in contact with another surface of said body, and means applying a potential between the rectifying electrode and said body in the back direction, positioning said device such that the contact area between the rectifying electrode and the body is adjacent said point, and detecting any abrupt change occurring in electron current flow from said body to said rectifying electrode.

7. Apparatus including a device comprising a body of P-type germanium semi-conducting material, a rectifying electrode in contact with one surface of said body, and a base electrode in contact with another surface of said body, means applying a potential between said body and said rectifying electrode in the back direction, and means passing a pulsation of electrical current through said device in response to a sudden lowering of the back resistance across said device.

8. Apparatus according to claim 7 including means for directing radiant energy to said body.

9. Apparatus according to claim 8 in which said energy directing means is a light source.

10. Apparatus including a device comprising a body of P-type germanium semi-conducting material, a rectifying electrode in contact with one surface of said body, and a base electrode in contact with another surface of said body, means applying a potential between said body and said rectifying electrode in the back direction, means for detecting electron current flow between said body and said rectifying electrode, and means for directing energy from the class consisting of heat and light energy to said body.

RALPH BRAY.
KARL LARK-HOROVITZ.

References Cited in the file of this patent

UNITED STATES PATENTS

| Number | Name | Date |
|---|---|---|
| 2,486,776 | Barney | Nov. 1, 1949 |
| 2,502,479 | Pearson et al. | Apr. 4, 1950 |
| 2,504,628 | Benzer | Apr. 18, 1950 |
| 2,530,110 | Woodyard | Nov. 14, 1950 |
| 2,543,039 | McKay | Feb. 27, 1951 |